US006560213B1

(12) United States Patent
Izadpanah et al.

(10) Patent No.: US 6,560,213 B1
(45) Date of Patent: May 6, 2003

(54) WIDEBAND WIRELESS ACCESS LOCAL LOOP BASED ON MILLIMETER WAVE TECHNOLOGY

(75) Inventors: Hossein Izadpanah, Newberry Park, CA (US); Daniel J. Gregoire, Thousand Oaks, CA (US); Hui-Pin Hsu, Northridge, CA (US); James H. Schaffner, Chatsworth, CA (US)

(73) Assignee: HRL Laboratories, LLC, Malibu, CA (US)

(*) Notice: Subject to any disclaimer, the term of this patent is extended or adjusted under 35 U.S.C. 154(b) by 0 days.

(21) Appl. No.: 09/275,761

(22) Filed: Mar. 24, 1999

(51) Int. Cl.[7] ................................................ H04Q 7/20

(52) U.S. Cl. .......................... 370/338; 370/278; 455/41

(58) Field of Search ................................. 370/328, 329, 370/338, 277, 278, 279, 280; 455/11.1, 16, 17, 20, 21, 22, 23, 500, 501, 42, 421

(56) References Cited

U.S. PATENT DOCUMENTS

| | | | | | |
|---|---|---|---|---|---|
| 4,293,833 | A | * | 10/1981 | Popa | 333/239 |
| 5,890,055 | A | * | 3/1999 | Chu et al. | 455/16 |
| 6,006,069 | A | * | 12/1999 | Langston | 455/524 |
| 6,049,593 | A | * | 4/2000 | Acampora | 359/109 |
| 6,141,557 | A | * | 10/2000 | Dipiazza | 455/446 |
| 6,226,525 | B1 | * | 5/2001 | Boch et al. | 455/504 |
| 6,243,427 | B1 | * | 6/2001 | Stockton et al. | 332/103 |
| 6,359,873 | B1 | * | 3/2002 | Kobayashi | 370/311 |

FOREIGN PATENT DOCUMENTS

WO    WO 98/26520    * 6/1998

OTHER PUBLICATIONS

C. A. Brackett, A. S. Acampora, J. Sweitzer, G. Tangonan, M. T. Smith, W. Lennon, K–C. Wang, and R. H. Hobbs, "A Scalable Multiwavelength Multihop Optical Network: A Proposal for Research on All–Optical Networks", May/Jun. 1993, Journal of Lightwave Technology, vol. 11, No. 5/6, pp.736–753.

D. Gray, "A Broadband Wireless Access System at 28GHz", 1997 Wireless Communications Conference, IEEE, pp. 1–7.

H. Graves, "A Detailed Analysis of MMDS and LMDS", Feb. 23–26, 1997 IEEE MTT–S Symposium, Vancouver, B.C., Canada, on Technologies for Wireless Applications Digest, pp. 7–10.

R. E. Wagner, R.C. Alferness, A.A.M. Saleh, and M.S. Goodman, "Monet: Multiwavelength Optical Networking", Jun. 1996, Journal of Lightwave Technology, vol. 14, No. 6, pp. 1349–1355.

Bosch web–site information.

(List continued on next page.)

*Primary Examiner*—Nay Maung
*Assistant Examiner*—Jean A Gelin
(74) *Attorney, Agent, or Firm*—Tope-McKay & Associates

(57) ABSTRACT

A wideband wireless access local loop system using millimeter wavelength wireless technology to provide wireless access to a series of customer interfaces, via a series of access interface points, to a backbone network of central nodes interconnected by a high transmission-rate broadband medium such as fiber optic cable. The network architecture is useful for providing a two-way high-speed data transfer system to structures without the need for physical wiring. Data transfer within the network may optionally be either analog or digital, and may be optimized for either two-way communication or one-way distribution.

10 Claims, 7 Drawing Sheets

OTHER PUBLICATIONS

H. Izadpanah, "LMDS: A Broadband Wireless Access Technology: An Overview," The 3rd IAA Annual Conference on "Computers and Communications," The City University of New York, New York, Sep. 1998.

H. Izadpanah, D. Gregoire, J. Schaffner, and HP Hsu, "MM–Wave Wireless Access Technology For The Wideband Wireless Local Loop Applications," 1998 IEEE Radio and Wireless Conference (RAWCON'98) Colorado Springs, CO, Aug. 1998.

J. Schaffner, H. Izadpanah, and HP Hsu, "Millimeter Wave Wireless Technology and Testbed Development for Wideband Infrastructure Access," WCC'98, San Diego, CA, Nov. 1998.

H. Izadpanah, "LMDS Technologies For Broadband Wireless Local Loop Applications," IEEE 802.16 Standard Document, published Jul. 1999.

* cited by examiner

Prior Art LMDS System With Multiple Cells

WIDEBAND WIRELESS ACCESS LOCAL LOOP BASED ON MILLIMETER WAVE TECHNOLOGY

TECHNICAL FIELD

The present invention discloses techniques and architecture to implement a high-speed wireless local loop network using a microwave/millimeter wave wireless radio link between a user and a gateway which, in turn, is connected to a broadband backbone network.

BACKGROUND OF THE INVENTION

In the data transfer industry, the demand for greater bandwidth has created a bottleneck in user access and in approximately the first and/or last mile of the network. The 1996 FCC release of the spectrum in the 27 to 31 GHz band for Local to Multipoint Distribution Services (LMDS), and the availability of the 5 GHz U-NII band are accelerating the development of wireless broadband network solutions. Traditionally, LMDS and Multi-channel Multipoint Distribution Services (MMDS) have been used to deliver video programs for education and entertainment in an analog format, with broadcast radii of one to five miles, and ten to forty miles, respectively. With the increasing acceptance of digital video and video compression methods alongside the increased system capacity, the need for two-way high-bandwidth transmissions in digital form is gaining importance. The current digital LMDS system, with its large usable bandwidth at mm-wave frequencies, is capable of offering high-speed data transmission rates of up to several Gbps, a sufficient transfer rate to support applications such as high-speed Internet, interactive video, video conferencing, while simultaneously including many other traditional broadcast and digital television channels. The LMDS and MMDS services operate in a cellular fashion, transmitting information between a central hub and fixed subscriber units, which are installed at businesses and homes, using highly directional antennas.

Although the transmission-rate related benefits of the current LMDS and MMDS architectures can be readily seen, the conventional LMDS and MMDS system concepts and architectures were originally designed for one-way distribution, and are not optimized for two-way broadband applications to home and small business users concentrated in highly populated regions such as city and downtown areas. Additionally, the current LMDS architecture suffers heavily from difficulties in installation and alignment, high radiation power to broadcast over a wide coverage radius, and losses due to multipathing, obstructions, excessive environment-related signal attenuation, and adjacent cell interference. Extensive literature exists regarding LMDS and MMDS system technology concerning both theoretical and device-specific aspects as surveyed, for e.g., by:

D. Gray, "A Broadband Wireless Access System at 28 GHz", 1997 Wireless Communications Conference, IEEE, pp. 1–7.

H. Graves, "A Detailed Analysis of MMDS and LMDS" Feb. 23–26, 1997 IEEE MTT-S Symposium, Vancouver, B. C., Canada, on Technologies for Wireless Applications Digest, pp. 7–10.

H. Izadpanah, D. Gregoire, J. Schaffner, and H. P. Hsu, "MM-Wave Wireless Access Technology For The Wideband Wireless Local Loop Applications", 1998 IEEE Radio and Wireless Conference (RAWCON'98) Colorado Springs, Colo., August, 1998.

H. Izadpanah, "LMDS: A Broadband Wireless Access Technology: An Overview", *The 3rd IAA Annual Conference on "Computers and Communications"*, The City University of New York, N.Y., September 1998.

Birendra Dutt and James K. Chan, "Equipment for the LMDS Band", $3^{rd}$ Annual Wireless Communications Conference Digest, WCC '98, San Diego, Calif. 1998, pp. 47–51.

J. Schaffner, H. Izadpanah, and H. P. Hsu, "Millimeter Wave Wireless Technology and Testbed Development for Wideband Infrastructure Access", WCC '98, San Diego, Calif., November 1998.

In contrast, the present invention is intended to provide a two-way broadband data transfer method and to overcome the transmission difficulties associated with the conventional MMDS and LMDS technologies.

SUMMARY OF THE PRESENT INVENTION

In accordance with the present invention, architectures and network implementation techniques for a wideband wireless access local loop using millimeter wave band technology provide a high-speed data transfer link between customer interface equipment and access interface equipment. This link serves as a gateway to a network including processing nodes interconnected by a high-transmission rate medium such as fiber optic cable. System operation is based on the use of millimeter wave transceiver/antenna positioned in a close proximity of up to a few hundred meters to allow for the wireless transfer of data to and from local structures without the logistical and financial difficulties associated with rain attenuation, object blockage, multipath dispersion, and high broadcast power requirements.

DETAILED DESCRIPTION

Figure 1:
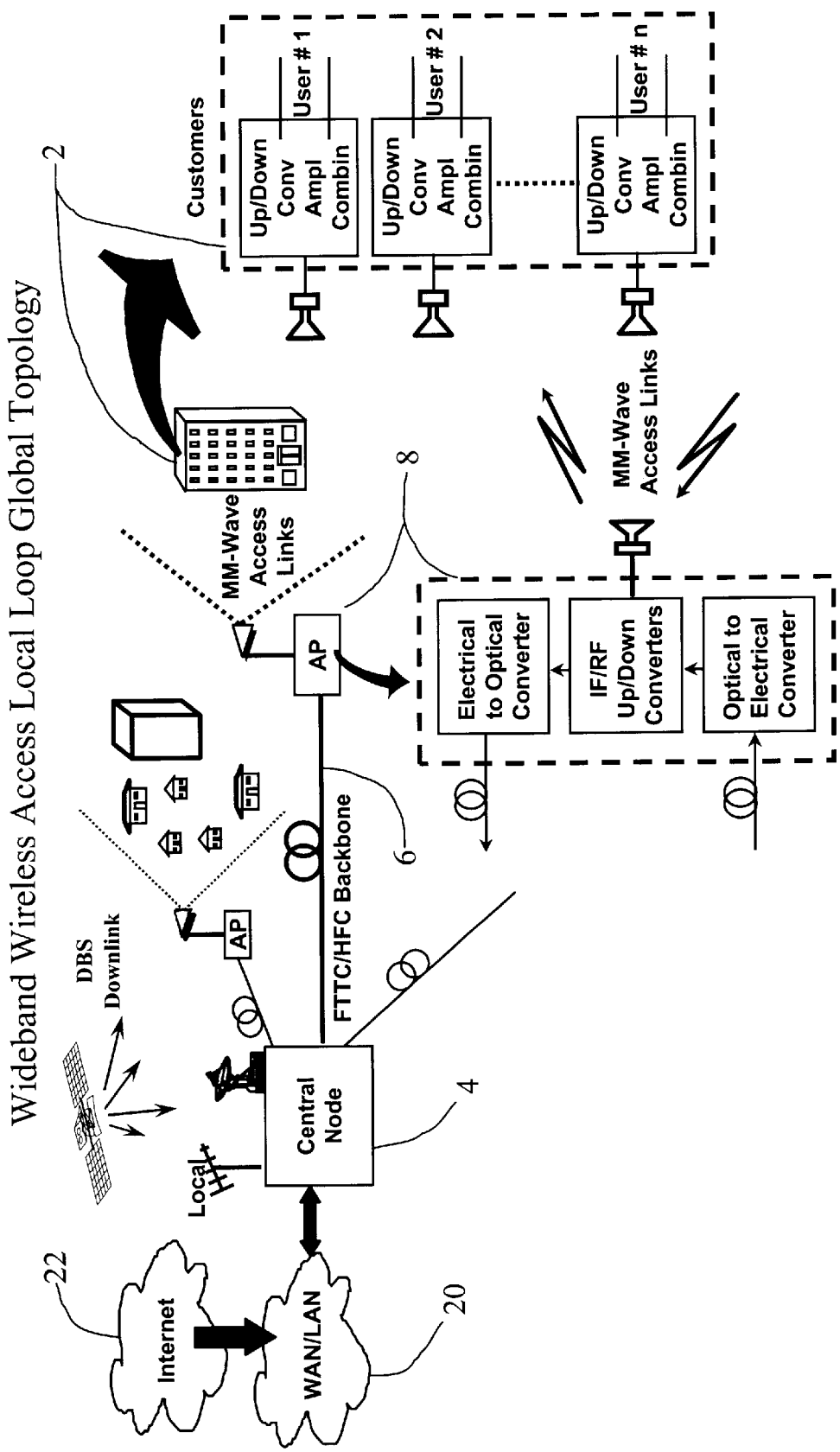
FIG. 1 is a diagram demonstrating the global topology of the wideband wireless access local loop of the invention showing the interrelation of various input devices as well as exploded views of various components of the network.

A general demonstration of the global topology of the wideband wireless access local loop of the invention showing the interrelation of various input devices as well as exploded and semi-exploded views of various components is shown in FIG. 1. As shown, the architecture of the invention permits one or more customer interfaces 2 to access a central node 4 via a millimeter wave link between access interface points 8 and the customer interfaces 2. The access interface points 8 are connected to the central nodes 4 by a broadband fiber optic cable 6 to provide rapid bi-directional data transfer. A single central node 4 may be connected to multiple access interface points 8, thereby creating a local loop network based on the use of millimeter wave data transfer between the access interface points 8 and the customer interfaces 2 and allowing for a rapid and low-cost deployment of high-speed data transfer equipment into areas which do not have sufficient physical infrastructure. Furthermore, a series of central nodes 4 may be interconnected to form a larger network which may be part of, or may be connected to, a wide/metropolitan area network 20 and the Internet 22. As demonstrated at the central node 4, input and output devices may also include, but is not limited to other antenna systems and satellite systems. Additionally, the network architecture may be used as an interconnect for high-speed Ethernet LANs, Switches, and Servers in point-to-point and point-to-multipoint configurations. Further detail in the form of schematics demonstrating the individual components of the invention are demonstrated in FIG. 3 through FIG. 7.

Figure 2:
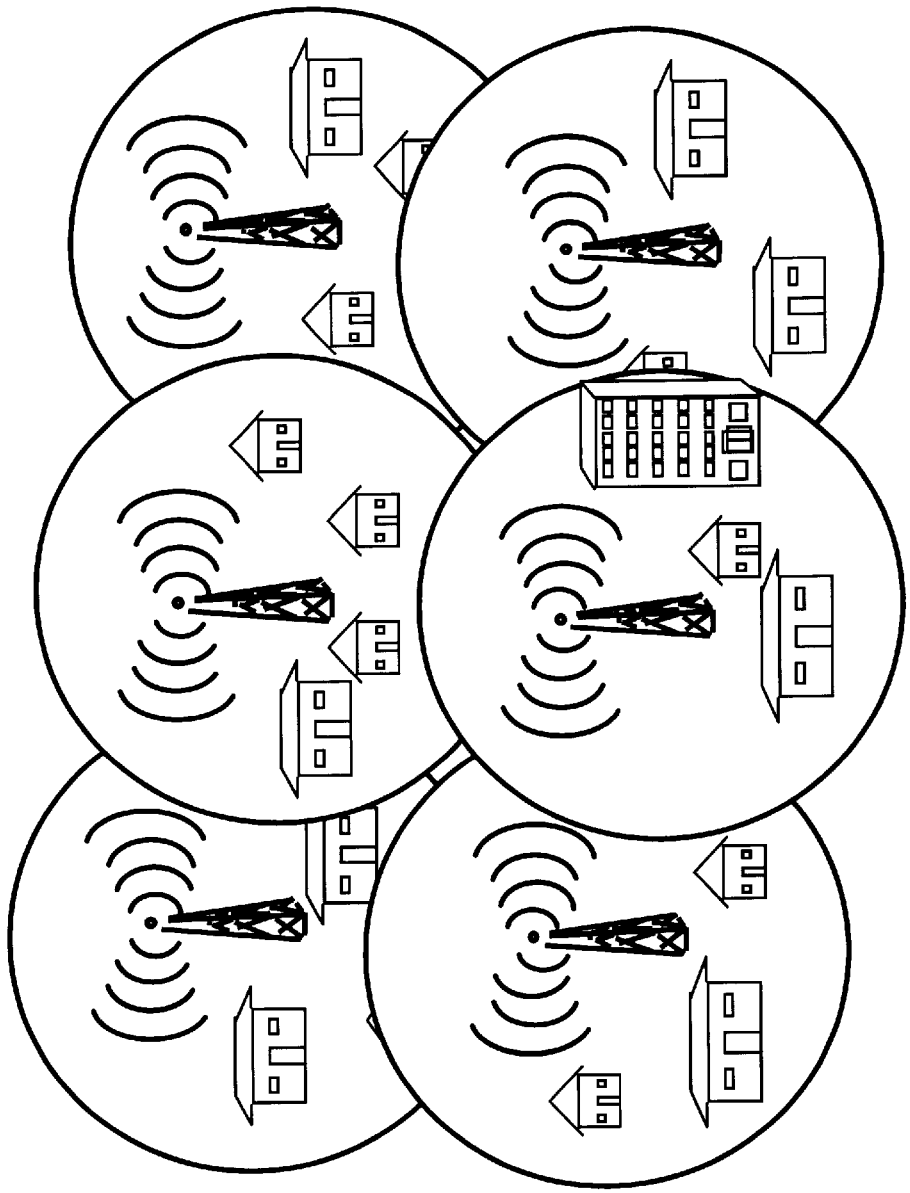
FIG. 2 is a diagram demonstrating a prior art LMDS system with multiple broadcast cells.

FIG. 2, given for comparison, demonstrates a typical prior art LMDS system with its broad coverage area, omni-directional antenna, and high power output. FIG. 1 and FIG. 2 are given. for comparison to demonstrate some of the general differences between the present system and the prior art.

Figure 3:
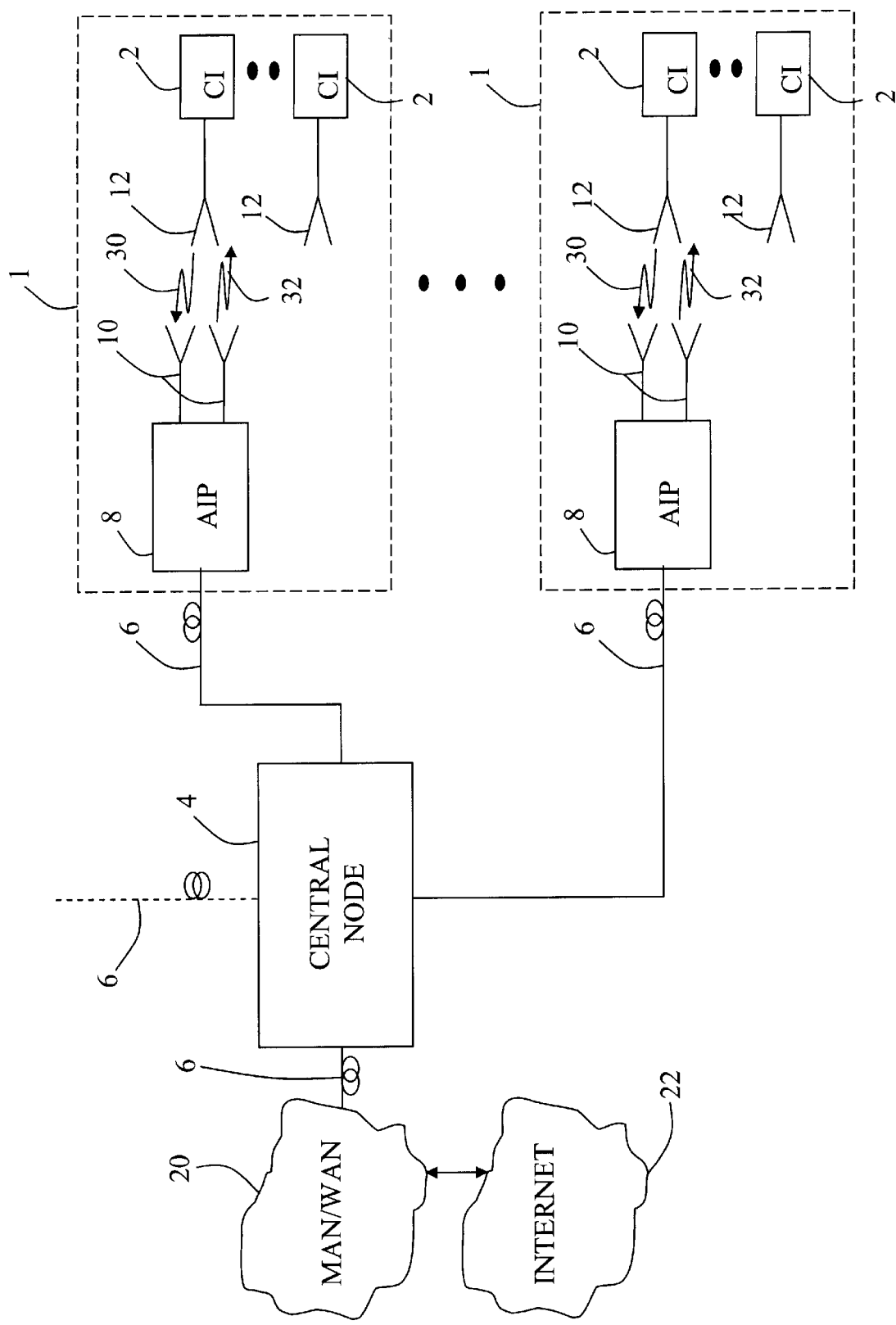
FIG. 3 is a schematic overview of the preferred embodiment of the wideband wireless access local loop of the invention.

The proposed wideband wireless access local loop network architecture, as shown in FIG. 3, includes one or more pico sectors 1, each designed to provide data transfer between a series of customer interfaces 2, which function as a user interfaces to allow communication with a larger network such as a series of central nodes 4 or a wide/metropolitan area network 20, or the Internet 22. Customer interfaces 2 may include two-way communication equipment such as a computer terminal or a multi-media interactive station, or may include only one-way receiving equipment such as a simple audio or video receiving station. Communication between the customer interfaces 2 and larger networks 4, 20, or 22 take place via the wideband wireless access local loop network, which utilizes millimeter wave transmissions between the customer interfaces 2 and access interface points 8 to provide a gateway between the system and the user. The customer interfaces 2 and the access interface points 8 include millimeter wave transceiver/antenna 12 and 10, respectively, operatively positioned under 1000, and preferably under 500, meters apart to allow for a low-power, line-of-sight transmission therebetween. An individual pico sector 1 is preferably designed to provide data transfer between one building and a larger network, although it may be designed to accommodate more than one building when required. In order to provide such service, a tailored broadcast area, free from interference either to or from other nearby pico cells 1 is required. By providing transceiver/antenna 10 and 12, positioned on street lamps or other nearby buildings, a short-distance, line-of-sight transmission path between the access interface points 8 and the customer interfaces 2 may be utilized, allowing transmission power requirements to be reduced to a safe, practical, and economical level, while allowing for high signal integrity within the localized broadcast area. The access interface points 8 provide a passive, high-speed gateway for interaction between one or more customer interfaces 2 and one or more central nodes 4.

Broadband fiber optic cable 6 provides the means of data transfer between the access interface points 8 and the central nodes 4, as well as between central nodes 4 and other central nodes 4. The central nodes 4 serve as data storage, switching, service integration, and processing centers, and may also serve as part of a wide/metropolitan area network 20, or as a gateway to the Internet 22 via broadband fiber optic cable 6. A system of central nodes may include a plurality of central nodes 4 which may be interconnected via broadband fiber optic cable 6 to form a web-like network of central nodes 4, each serving as part of, or as a complete, wide area network 20. The central. nodes 4 may also be arranged in a hierarchical fashion so that one or more central nodes 4 can support specialized or superior functions relative to the other central nodes 4. In transmissions from the central nodes 4 to the customer interfaces 2 via the access interface points 8, signals may be converted to electrical or optical form as necessary before being converted to millimeter wave form. After transmission of a millimeter wave signal 32 by the transceiver/antenna 10 of the access interface points 8, the signal is received by the millimeter wave transceiver/antenna 12 of the customer interfaces 2, where it is converted into an intermediate frequency suitable for use by the equipment resident at the customer interface 2. Conversely, in transmissions from the customer interfaces 2 to the central nodes 4 via the access interface points 8, signals 30 are sent in millimeter wave form from the millimeter wave transceiver/antenna 12 of the customer interfaces 2 for receipt by the millimeter wave transceiver/antenna 10 of the access interface points 8. The signal is then converted into optical form for transmission along the broadband fiber optic cable 6 to the central nodes 4 and for further transmission into the larger backbone networks 20 and 22.

Figure 4:
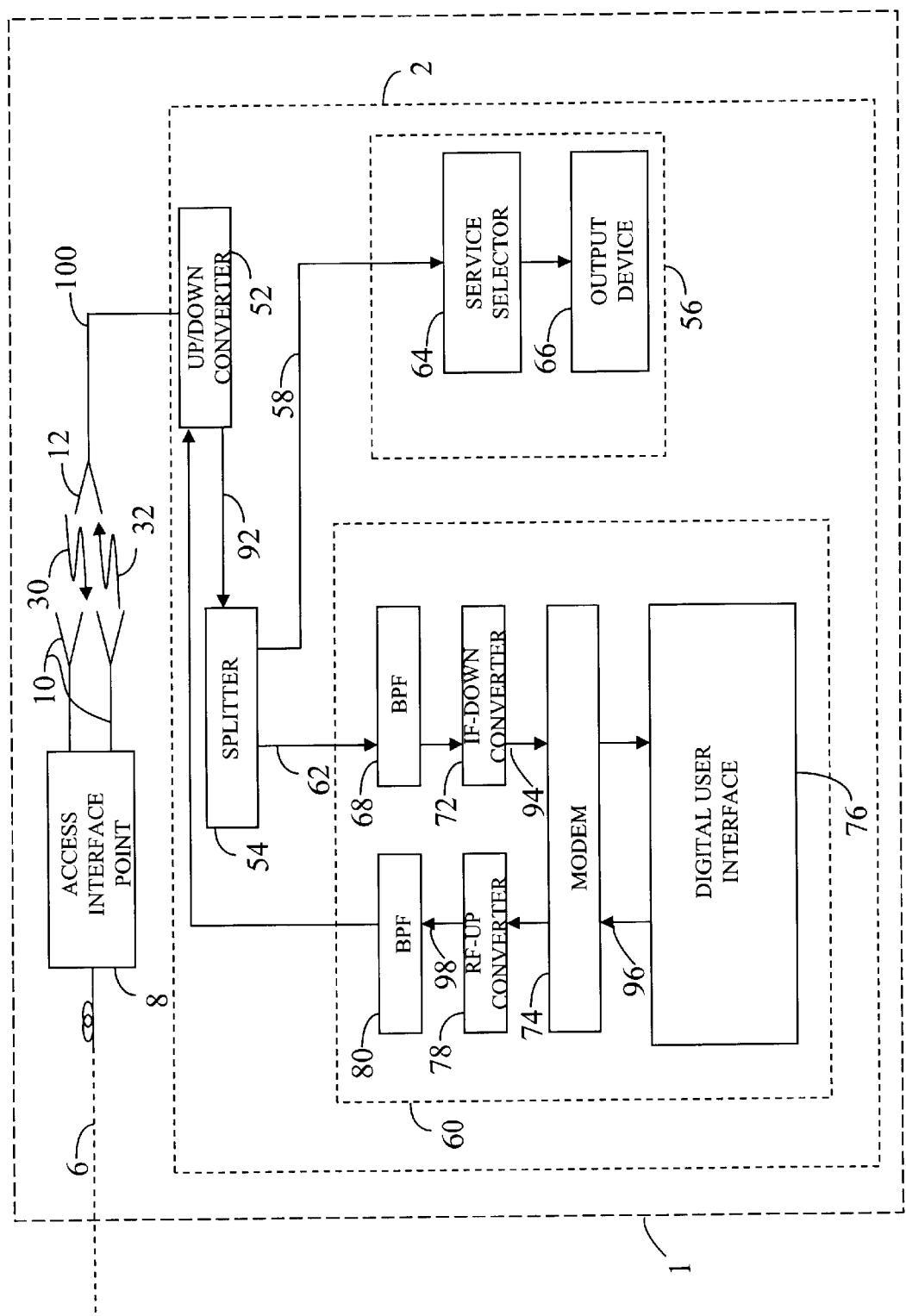
FIG. 4 is a detailed diagram of the preferred embodiment of the typical customer interface equipment for a single user, demonstrating integrated bi-directional and broadcast services.

A typical customer interface 2, within a pico sector 1, is shown in greater detail in FIG. 4 with millimeter wave transceiver/antenna 12, in which the transmitter and receiver may optionally comprise either separate or integrated components. Upon receipt of a signal 32 in millimeter wavelength form from the millimeter wave transceiver 10 of an access interface point 8 by the millimeter wave transceiver 12 of a customer interface, the signal 32 is down converted from the received frequency into a signal having an intermediate frequency 92 by one or more down converters 52. The signal having an intermediate frequency 92 may then be passed through a splitter 54 where a first portion of the divided signal is sent into a broadcast services portion 56 along a first path 58 and a second portion of the divided signal is sent into an interactive portion 60 along a second path 62. Although FIG. 4 demonstrates use of both a broadcast services portion 56 and an interactive portion 60, it is not necessary for both portions to be present. The system could be used with either or both portions, depending on the specific application. Furthermore, the millimeter wave transceiver/antenna 10 of the access interface points 8 and the millimeter wave transceiver/antenna 12 of the customer interfaces 2 may be configured for broadcast-only use by using one-way transmission equipment only. Along the first path 58, after the signal 92 is down-converted, it is filtered and channel-selected for the desired channel by a service selector 64, which extracts the desired data from the signal 92 and converts it into a form useful for display by an output device 66. The service selector 64, may include one or more band pass filters to prepare the signal 92 for use in an output device 66, which may encompass such devices as digital or analog televisions, stereo equipment, or any other suitable display device. Along the second path 62, into the interactive portion 60, the signal 92 may be filtered for the desired frequency by one or more optional band pass filters 68, and is then further down converted from a signal having an intermediate frequency 92 to a signal having a lower intermediate frequency 94 by a down converter 72. The signal having a lower intermediate frequency 94 is then passed through a modem 74, where it is demodulated into a useful form and passed into a user interface 76. The user interface may include a multiplexer/demultiplexer to split the signal 94 into desired signal components for use in such devices as interactive video systems, computers, and Internet devices, among others. When sending an outgoing signal 96 from the user interface 76, the outgoing signal 96 may be sent through a multiplexer/demultiplexer to combine signals, and is then passed through a modem 74, where the transmission is modulated in preparation for further line transmission. The outgoing signal 96 is then up-converted by one or more up-converters 78 to an, intermediate frequency outgoing signal 98, and then may be filtered for the desired sideband by an optional band pass filter 80. The intermediate frequency outgoing signal 98 is then further up-converted into an outgoing signal having a higher frequency 100 by one or more up/down converters 52 in preparation for transfer as a millimeter wave signal 30 by the millimeter wave transceiver/antenna 12 of the customer interface 2, to be received by the millimeter wave transceiver 10 of the access interface point 8, where it may be converted to optical form for further transmission to the central nodes 4 (see FIG. 3) via the broadband fiber optic cable 6 (see FIG. 3 as well). Thus, the customer interface provides the necessary hardware to allow the operation of a one-way receiving station in the form of an output device or a two-way multimedia center in the form of a user interface. As necessary for a particular operation, a single customer interface may be configured to provide a combination of multiple output devices and multiple user interfaces.

Figure 5:
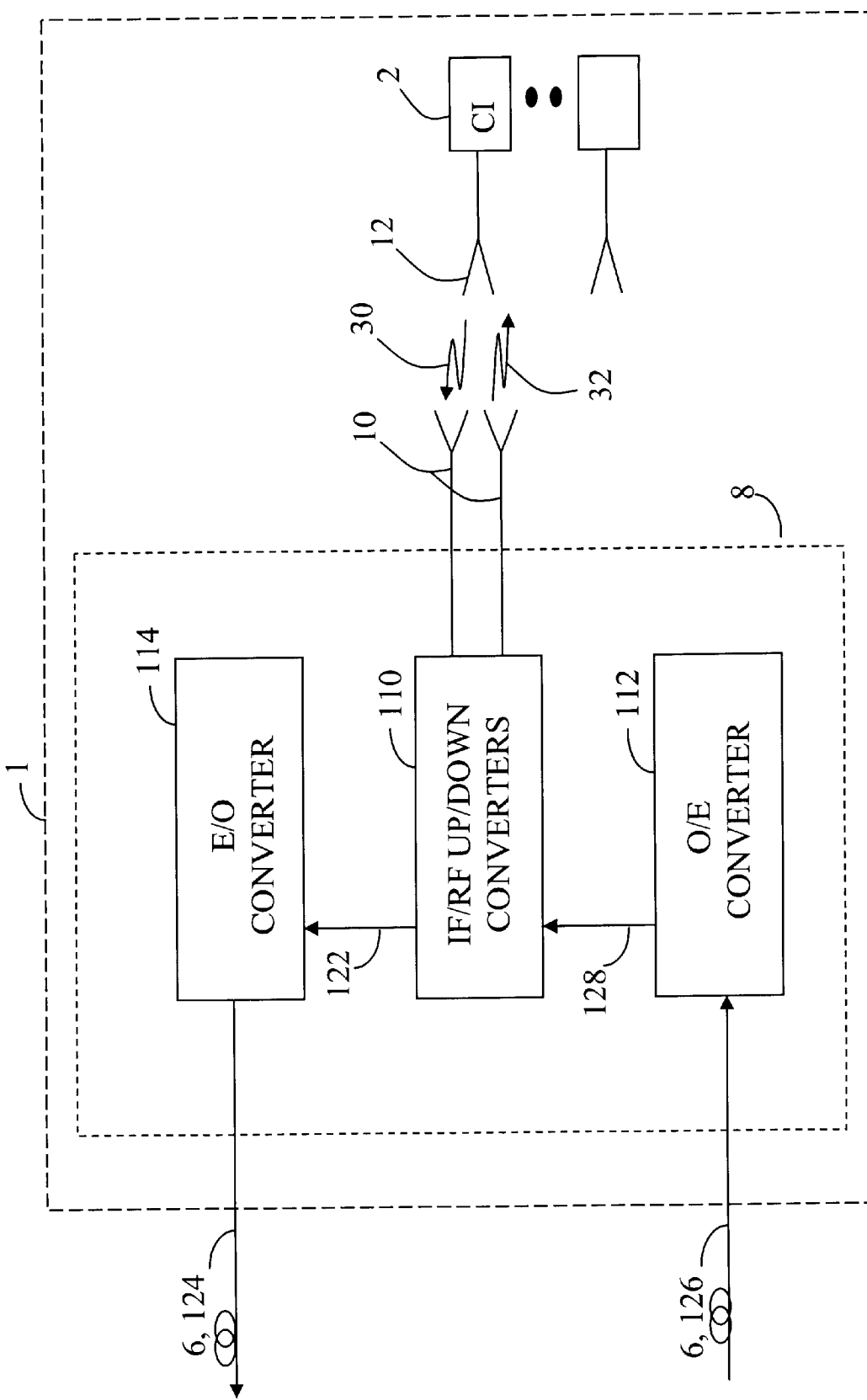
FIG. 5 is a diagram highlighting the equipment of an access interface point and demonstrating its relationship with the broadband fiber optic cable leading to the central nodes and the customer interfaces.

A typical embodiment of the relationship between the passive transmitting, receiving, and signal processing equipment of the access interface points 8 and the customer interfaces 2 within a particular pico sector 1 is shown in FIG. 5. For purposes of this invention, the preferred distance between the millimeter wave transceiver/antenna 10 of the access interface points 8 and the millimeter wave transceiver/antenna 12 of the customer interfaces 2 is under 1000, and preferably less than 500, meters. It is also preferred that the millimeter wave transceiver/antenna 10 of the access interface points 8 and the millimeter wave transceiver/antenna 12 of the customer interfaces 2 are positioned in such a manner as to provide for a line-of-sight transmission. By maintaining a short distance and an obstruction-free signal path between the millimeter wave transceiver/antenna 10 of the access interface points 8 and the millimeter wave transceiver/antenna 12 of the customer interfaces 2, the transmission energy in both directions is minimized, as are the problems associated with rain-related attenuation, multipath dispersion, blocking, etc. Thus, a reliable data transfer system with minimal losses and low power consumption relative to a typical LMDS system may be achieved using this system architecture. After receipt of an incoming signal 30 from the millimeter wave transceiver/antenna 12 of the customer interfaces 2 by the millimeter wave transceiver/antenna 10 of the access interface points 8, the incoming signal 30 is passed through one or more up/down converters 110 resident in the access interface point 8, down-converting the signal 30 to an intermediate frequency signal 122, and then passing it through an electrical to optical converter 114 where it is converted from electrical to optical form for transmission along the broadband fiber optic cable 6 as an optical signal 124 to a central node 4 (see FIG. 3). When transmitting a signal to the customer interfaces 2 from a central node 4, an optical signal 126 is received by the central node 4 (see FIG. 3) via the broadband fiber optic cable 6, and is converted to an electrical signal having an intermediate frequency 128 by an optical to electrical converter 112. The electrical signal 128 is then passed through one or more up/down converters 110 where it is up-converted into a millimeter wave signal 32 to be sent by the millimeter wave transceiver/antenna 10 of the access interface point 8 for receipt by the millimeter wave transceiver/antenna 12 of the customer interface 2.

Figure 6:
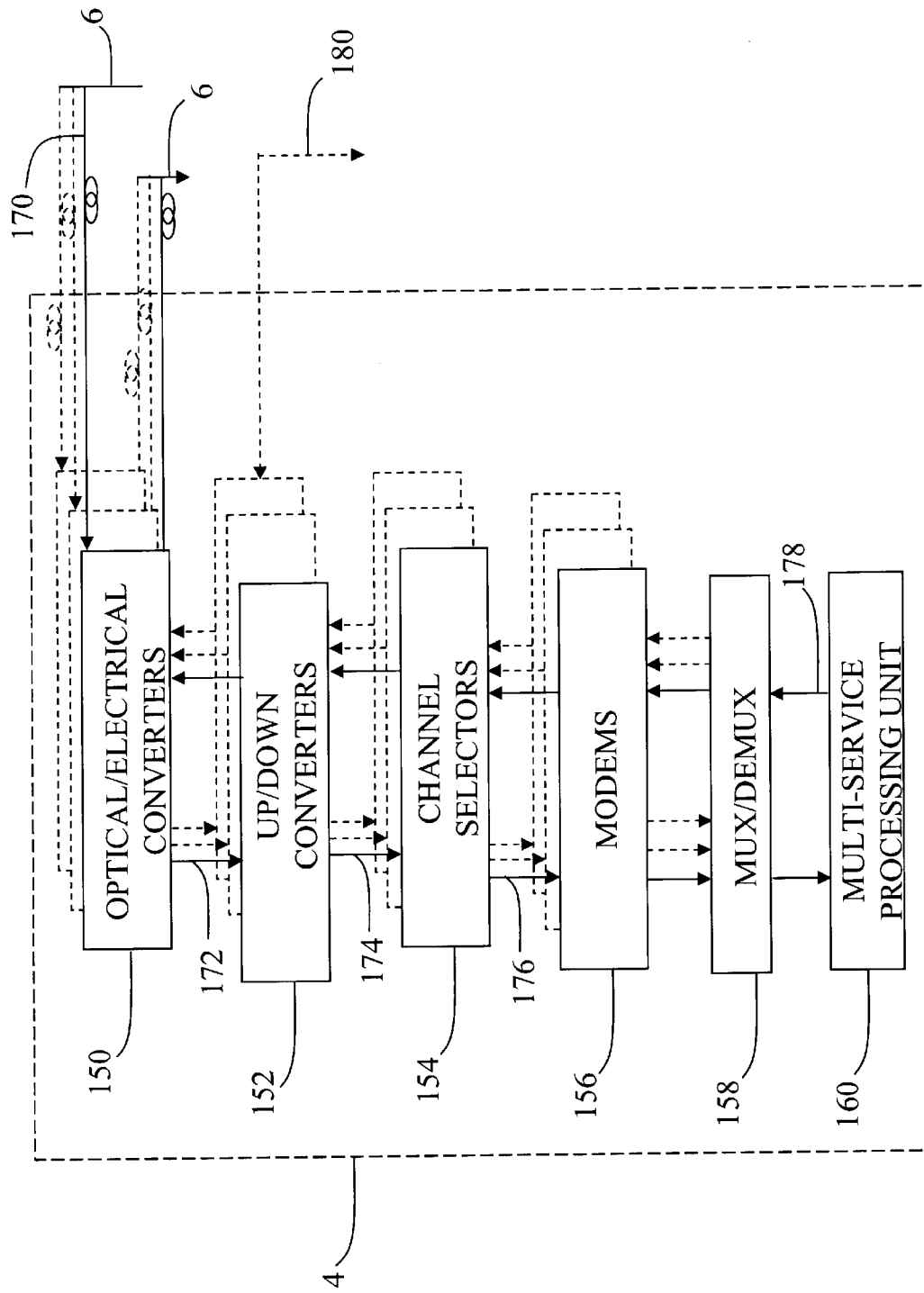
FIG. 6 is a diagram of the equipment used in a typical central node for information exchange with multiple access interface points and other information resources.

The equipment used in the typical central node 4 is shown in FIG. 6, where transmissions are either sent to, or received from, one or more access interface points 8 (see FIG. 3) or one or more central nodes 4 along the broadband fiber optic cable 6. Upon receipt by a central node 4, an incoming optical signal 170 is divided and sent to an optical to electrical converter 150, where it is converted into an electrical signal 172. The electrical signal 172 is then passed through one or more up/down converters 152 where it is down-converted into a lower intermediate frequency electrical signal 174. Next, the signal 174 is sent into one or more channel selectors/combiners 154, each of which separates one or more data channels 176 from the intermediate frequency electrical signal 174. After selection, each individual data channel 176 is sent through a modem 156, where the signal 174 is demodulated and is then demultiplexed by the multiplexer/demultiplexer 158, separating out the different channels therefrom. The signal is then passed into the multi-service processing unit 160, a generic device, which may include such control functions as wireless format conversion, power control, bandwidth allocation, etc., and may provide a connection to the Internet backbone, a gateway for digital broadcasting, video integration, and/or other data processing-functions. When transmitting a signal from the multi-service processing unit 160, the outgoing lower frequency signal 178 is first passed through the multiplexer/demultiplexer 158 where it may be combined with other signals into a particular channel. The signal 178 is then modulated for further line transmission by the modem 156, and is then combined with other channels by the channel selectors/combiners 154 for transmission via the broadband fiber optic cable 6 to the access interface point 8 (see FIG. 3) route to the customer interface 2 (see FIG. 3). Additionally, signals may be provided to or transmitted from a central node 4 via a service integration port 180, which serves as a generic input/output device for the integration of services from satellite, cable telephone, and other established or future infrastructures. The service integration port 180 may also provide for direct integration with customer interfaces 2 in cases when there is no need for millimeter wave transmissions, thus providing a hybrid of millimeter wave integrated customer interfaces and directly connected customer interfaces. By allowing such structural variation, the need for additional optical/electrical conversion equipment as well as additional fiber optic cable may be avoided, allowing the system to be built in a more cost-efficient manner.

Figure 7:
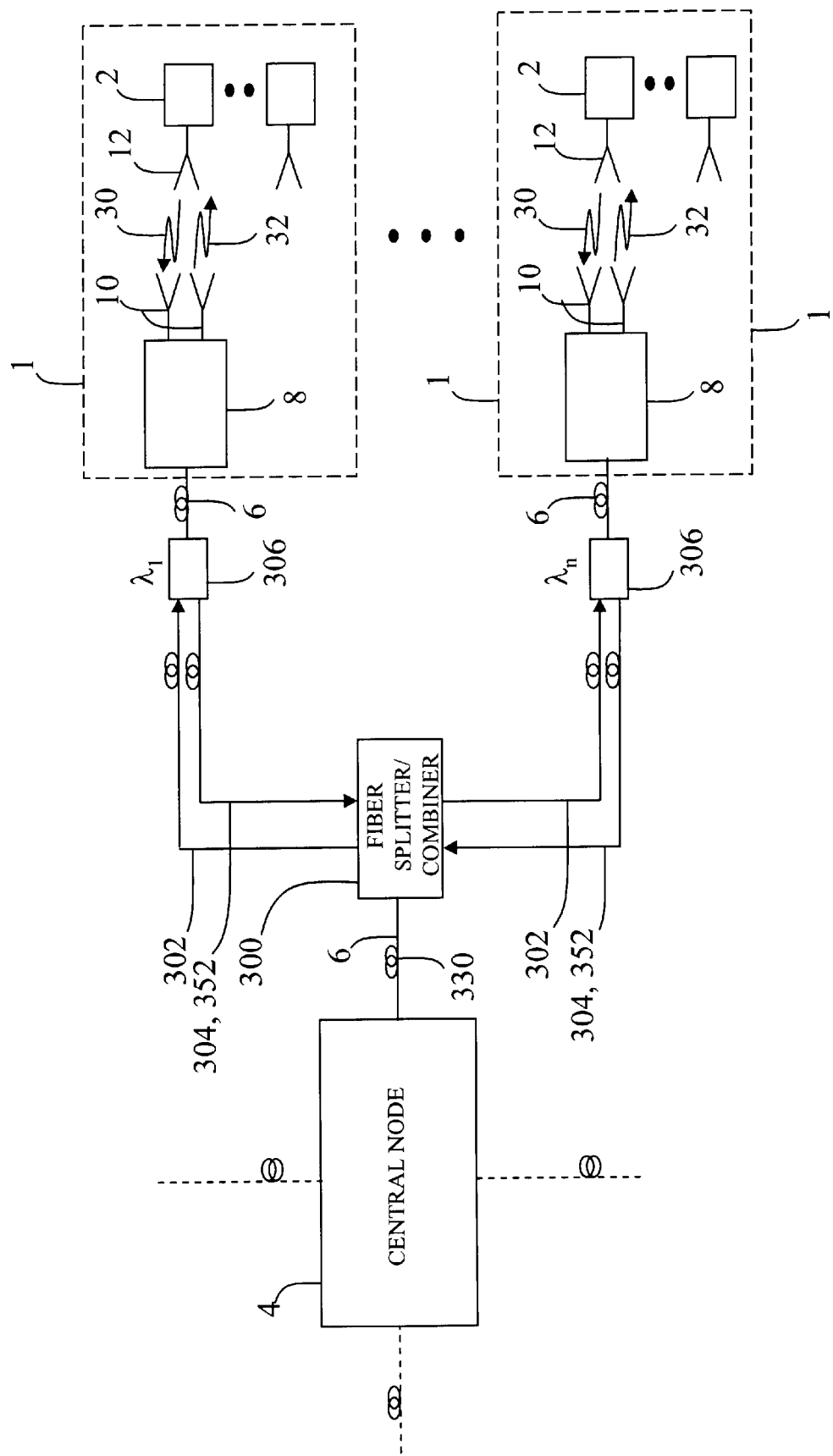
FIG. 7 is a diagram demonstrating the relationships between a central node and several access interface points using a fiber splitter/combiner and wavelength division multiplexing (addressing) scheme.

An alternative embodiment utilizing a fiber splitter/combiner 300, which includes wavelength division multiplexing equipment, and wavelength-specific wavelength selecting equipment 306 to provide for selective data transfer between the central nodes 4 and the access interface points 8 is shown in FIG. 7. In this embodiment, a multiple optical wavelength signal 330 may be sent from a central node 4 along a broadband fiber optic cable 6 to an access interface point 8. Along this pathway, the optical signal 330 is split among a series of outgoing broadband fiber optic cable divisions 302. Each of the outgoing broadband fiber optic cable divisions 302 has wavelength-specific wavelength selecting equipment 306 to select an assigned wavelength from the optical signal 330, which is then transmitted via another section of broadband fiber optic cable 6 for use by a particular access interface point 8 for broadcast to the customer interfaces 2 serviced by that particular access interface point 8. The access interface point equipment is the same, both functionally and componentally as shown in FIG. 3, and as described previously. In transmission from a customer interface point 2 to a central node 4, a millimeter wave signal 30 is received by the millimeter wave transceiver/antenna 10 of the access interface points 8 where it is down-converted into an intermediate frequency and then into an optical signal having a particular wavelength for transmission via a section of broadband fiber optic cable 6 to an incoming broadband fiber optic cable division 304. The optical transmission 352 is then passed through the fiber splitter/combiner 300 where it is multiplexed/combined with optical transmissions 352 from other access interface points 8, each having a particular wavelength, and then sent along the broadband fiber optic cable 6 to the central node 4 for processing or for further transmission to other central nodes 4 or into a wide area network/metropolitan area network 20 or over the Internet 22 (see FIG. 3). By using wavelength selecting equipment 306, multiple outgoing broadband fiber optic cable divisions 302, multiple incoming broadband fiber optic cable divisions 304, and a fiber splitter/combiner 300 with wavelength division multiplexing equipment, an access interface point 8 may be designed so that only a desired signal from the central node 4 is transmitted via the millimeter wave transceiver/antenna 10 of the access interface point 8 for receipt by the millimeter wave transceiver/antenna 12 of the customer interfaces 2, thus allowing for selective distribution of information by selection of specific optical wavelengths.

The foregoing descriptions of the preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A wideband wireless access local loop network including:
   a. one or more customer interfaces, at least one millimeter wave transceiver/antenna with processing equipment operatively attached thereto, such that said processing equipment processes signals received by the millimeter wave transceiver/antenna, and such that the millimeter wave transceiver/antenna transmits signals generated by the processing equipment;
   b. one or more access interface points, connected to an information network, each having a signal transfer means and at least one millimeter wave transceiver/antenna operatively connected thereto; said signal transfer means operatively connected to said millimeter wave transceiver/antenna to allow a signal received in the millimeter wave transceiver/antenna to be transferred to a data network and to allow a signal to be received from a data network to be transferred for broadcast by the millimeter wave transceiver/antenna of the access interface point to the millimeter wave transceiver/antenna of a customer interface; and
   c. said millimeter wave transceiver/antenna of the customer interfaces and the millimeter wave transceiver/antenna of the access interface points operatively positioned less than 1000 meters apart such that a bi-directional, line-of-sight transmission is made between the millimeter wave transceiver/antenna of the customer interfaces and the millimeter wave transceiver/antenna of the access interface points; whereby a signal from the customer interface processing equipment is transferred, as a millimeter wave signal, to the access interface point and on to the information network, and whereby a signal from the information network is transferred, as a millimeter wave signal, to the customer interface processing equipment.

2. A wideband wireless access local loop network as set forth in claim 1 wherein:
   a. said signal transfer means of the access interface points further includes an up-converting means and an optical to electrical converting means; the up-converting means operatively attached to the millimeter wave transceiver/antenna of the access interface point and to the optical to electrical converting means such that an optical signal is received in the optical to electrical converting means and converted therein to an electrical signal having a frequency, the electrical signal being passed from the optical to electrical converting means into the up-converting means, increasing the frequency of the electrical signal in preparation for its transmission by the millimeter wave transceiver/antenna; and
   b. said signal transfer means of the access interface points further includes a down-converting means and an electrical to optical signal; the down-converting means being operatively attached to the millimeter wave transceiver/antenna of the access interface point and to the electrical to optical converting means such that an electrical signal is received by the millimeter wave transceiver/antenna of said access interface point as an electrical signal having a frequency, the electrical signal being passed from the millimeter wave transceiver/antenna into the down-converting means, decreasing the frequency of the electrical signal, and then from the down-converting means into the electrical to optical converting means, where it is converted to an optical signal for optical transmission; whereby an optical signal is received in the optical to electrical converting means of the access interface points and converted into a millimeter wave transmission by the millimeter wave transceiver/antenna or, conversely, a millimeter wave signal is received by the millimeter wave transceiver/antenna of the access interface points and converted into an optical form for transmission into a communication network or other system.

3. A wideband wireless access local loop network as set forth in claim 1 wherein the millimeter wave transceiver/antenna of the customer interfaces are replaced with millimeter wave receiving antennas, whereby customer interfaces of the wideband wireless access local loop network is selectively configured as receivers of broadcast services from the access interface points.

4. A wideband wireless access local loop network as set forth in claim 1 wherein:

a. said processing equipment of the customer interfaces includes a down-converting means and a broadcast services portion, the broadcast services portion including a service selector means and an output device;

b. said down-converting means operatively connected to the millimeter wave transceiver/antenna of the customer interfaces and to the service selector of the broadcast services portion such that a millimeter wave signal is received by the millimeter wave transceiver/antenna of the customer interfaces and passed to the down-converting means as an electrical signal having a frequency, the frequency being reduced by the down-converting means, the electrical signal then being passed from the down-converting means to the service selector means to extract a desired portion of the electrical signal; and c. said service selector means being operatively connected to the output device such that the desired portion of the electrical signal is interpreted and displayed by the output device; whereby a signal is broadcast from the millimeter wave transceiver/antenna of the access interface points and received by the millimeter wave transceiver/antenna of the customer interfaces, down-converted into a useful frequency, and channel-selected for a desired portion of the signal so that it is displayed in an output device, in the form of a television, an audio receiving station, or any other suitable display device whether audio, video, or some other format.

5. A wideband wireless access local loop network as set forth in claim 3 wherein:

a. said processing equipment of the customer interfaces includes a down-converting means and a broadcast services portion, the broadcast services portion including a service selector means and an output device;

b. said down-converting means operatively connected to the millimeter wave receiving antenna of the customer interfaces and to the service selector of the broadcast services portion such that a millimeter wave signal is received by the millimeter wave receiving antenna of the customer interfaces and passed to the down-converting means as an electrical signal having a frequency, the frequency being reduced by the down-converting means, the signal then being passed from the down-converting means to the service selector means to extract a desired portion of the electrical signal; and c. said service selector means being operatively connected to said output device such that the desired portion of the electrical signal is interpreted and displayed by the output device; whereby a signal is broadcast from the millimeter wave transceiver/antenna of the access interface points and received by the millimeter wave receiving antenna of the customer interfaces, down-converted into a useful frequency, and channel-selected for a desired portion of the signal so that it is displayed in an output device, in the form of a television, an audio receiving station, or any other suitable display device whether audio, video, or some other format.

6. A wideband wireless access local loop network as set forth in claim 4 wherein:

a. said processing equipment of the customer interfaces further includes a down-converting means, a splitter, and an interactive portion, said interactive portion including a first optional band pass filtering means, an intermediate frequency down-converting means, a modem, a bi-directional user interface, an intermediate frequency up-converting means, and a second optional band pass filtering means;

b. said down-converting means operatively connected to said receiving portion of said millimeter wave transceiver/antenna of said customer interfaces such that a millimeter wave received signal having a frequency is received in said millimeter wave transceiver/antenna of said customer interfaces and passed to said down-converting means as an electrical received signal having a frequency, said frequency of said electrical received signal being reduced to an intermediate frequency by said down-converting means of said customer interfaces, c. said splitter operatively connected to said down-converting means such that said electrical received signal having an intermediate frequency is divided into a first received signal part having a frequency and a second received signal part, said first signal received part having a frequency passing into said service selector of said broadcast services portion, and said second received signal part passing into said first optional band pass filtering means of said interactive portion of said customer interfaces to be filtered to eliminate unwanted signal noise;

d. said intermediate frequency down-converting means operatively connected to said first optional band pass filter to receive and further reduce said frequency of said second received signal part to a lower-intermediate frequency;

e. said modem operatively connected to said intermediate frequency down-converting means and to said user interface in order to receive and demodulate said second received signal part from said intermediate frequency down-converting means into a demodulated signal, said demodulated signal being passed into the user interface;

f. said user interface further connected to said modem such that an electrical sent signal having a frequency is passed from said user interface to said modem and modulated therein;

g. said modem further connected to said intermediate frequency up-converting means such that said frequency of said electrical sent signal is increased to an intermediate frequency;

h. said intermediate frequency up-converting means operatively connected to said second optional band pass filtering means such that the intermediate frequency electrical sent signal is filtered for undesired noise in preparation for transmission; and i. said up-converting means of said customer interface operatively attached to said second optional band pass filtering means and to said millimeter wave transceiver/antenna of said customer interface; said up-converting means receiving and increasing the frequency of said intermediate frequency electrical sent signal and to a transmission frequency, and passing said transmission frequency electrical sent signal to said millimeter wave transceiving signal for transmission as a millimeter wave sent signal.

7. A wideband wireless access local loop network as set forth in claim 2 further including broadband fiber-optic cable and at least one central node having data processing equipment, said central nodes being interconnected and connected to said access interface points by said broadband fiber optic cable; whereby said central nodes are operative to send and receive signals to and from the customer interfaces via the access interface points as well as to send and receive signals to and from other central nodes in the network.

8. A wideband wireless access local loop network as set forth in claim 7 wherein;
   a. said data processing equipment of the central nodes includes one or more optical to electrical converting means, a one or more main down-converting means, one or more channel selectors/combiners, one or more modems, a multiplexer/demultiplexer, and a multi-service processing unit;
   b. said optical to electrical converting means of said central nodes connected to said broadband fiber optic cable to receive an optical signal therefrom and to convert it into an received electrical signal having a frequency and channels;
   c. said main down-converting means connected to said optical to electrical converting means to decrease said frequency of said received electrical signal to an intermediate frequency;
   d. said channel selectors connected to said down-converting means to receive said intermediate frequency received electrical signal and to extract desired channels therefrom, said channels further including communication signals;
   e. said modems connected to said channel selectors/combiners to receive and demodulate said desired channels of said intermediate frequency received electrical signal;
   f. said multiplexer/demultiplexer operatively connected to said channel selectors/combiners and to said multi-service processing unit, said channel selectors/combiners operative to receive said demodulated desired channels of said intermediate frequency received electrical signal to separate desired communication signals therefrom for passage to the multi-service processing unit;
   g. said multi-service processing unit further connected to said multiplexer/demultiplexer such that one or more sent electrical signals each having a frequency is transmitted from the multi-service processing unit to the multiplexer/demultiplexer and combined for further transmission in channels;
   h. said multiplexer/demultiplexer further connected to said modems, said electrical signals transmitted in channels passed through said modems for modulation;
   i. said modems further connected to said channel selectors/combiners, said channels of said modulated electrical signals combined into a sent electrical transmission having a frequency by said channel selectors/combiners;
   j. said central nodes further include one or more main up-converting means and one or more electrical to optical converting means, said up-converting means connected to said channel selectors/combiners to receive said sent electrical transmission and to increase the frequency thereof; and
   k. said electrical to optical converting means connected to said main up-converting means and to said broadband fiber optic cable, said electrical to optical converting means receiving a sent electrical transmission from said up-converting means for conversion into an optical signal for transmission along the broadband fiber optic cable, whereby a signal is received from the network via the broadband fiber optic cable and converted into useful electrical form for processing in the multi-service processing unit or is sent from the multi-service processing unit and processed for conversion and transmission to the network via the broadband fiber optic cable.

9. A wideband wireless access local loop network as set forth in claim 8 wherein said central node further includes at least one central node millimeter wave transceiver/antenna, at least one millimeter wave transmission down-converting means, and at least one millimeter wave transmission up-converting means;
   a. said central node millimeter wave transceiver/antenna operatively connected to said millimeter wave transmission down-converting means such that a millimeter wave electrical transmission is received by said central node millimeter wave transceiver/antenna from said millimeter wave transceiver/antenna of said customer interfaces and down converted by said millimeter wave transmission down-converting means into a frequency useful by the main down-converting means of said central nodes, said millimeter wave transmission down-converting means operatively attached to said main down-converting means of said central nodes for further down-conversion; and
   b. said millimeter wave transmission up-converting means of said central node operatively attached to said main up-converting means of said central node such that a sent electrical transmission is received from said main up-converting means for further frequency increase; said central node millimeter wave transceiver/antenna operatively connected to said millimeter wave transmission up-converting means such that said sent electrical transmission is transmitted to said millimeter wave transceiver/antenna of said customer interfaces by said central node millimeter wave transceiver/antenna; whereby the central node contains the functional equivalent of the equipment resident at the access interface points for transmission of data to and from customer interfaces which are close to the central node without the need for additional equipment required by fiber optics.

10. A wideband wireless access local loop network as set forth in claim 7 wherein:
    a. said broadband fiber optic cable between the central nodes and the access interface points includes a fiber optic cable splitter/combiner, said fiber optic cable splitter/combiner operative to split said broadband fiber optic cable into transmitting broadband fiber optic cable segments;
    b. said access interface points further including wavelength selectors, said wavelength selectors optically connected to the transmitting broadband fiber optic cable segments and to the electrical to optical converting means of the access interface points to select and pass only a desired wavelength of an optical transmission sent from a central node via the broadband fiber optic cable in preparation for broadcast to the customer interface point by the access interface point; whereby a wavelength division multiplexed mixture of signals is sent along a broadband fiber optic cable, from a central node, to be split, demultiplexed, and wavelength-selected for the desired signal by the wavelength selector for broadcast by the access interface point; and
    c. said access interface points further including receiving broadband fiber optic cable segments operatively connecting the wavelength selectors to the fiber splitter/combiners such that a signal received in an access interface point from a customer interface is converted to an optical signal having a desired wavelength, wavelength division multiplexed by the wavelength selector to combine signals for transmission into the fiber splitter/combiner to be combined with other signals, and then sent to a central node.

* * * * *